(12) United States Patent
Wu et al.

(10) Patent No.: US 8,102,867 B2
(45) Date of Patent: Jan. 24, 2012

(54) BRIDGES AND COMPUTING DEVICES WITH BRIDGES

(75) Inventors: Shen-Rui Wu, Wanli Township (TW); Chiaming Hsiao, Dali (TW)

(73) Assignee: Ours Technology Inc., Jhubei (TW)

( * ) Notice: Subject to any disclaimer, the term of this patent is extended or adjusted under 35 U.S.C. 154(b) by 288 days.

(21) Appl. No.: 12/505,706

(22) Filed: Jul. 20, 2009

(65) Prior Publication Data
US 2010/0284415 A1    Nov. 11, 2010

Related U.S. Application Data (60) Provisional application No. 61/176,439, filed on May 7, 2009.

(51) Int. Cl.
| | |
|---|---|
| H04L 12/28 | (2006.01) |
| H04L 12/56 | (2006.01) |
| G06K 5/00 | (2006.01) |
| G06F 15/16 | (2006.01) |
| G06F 13/00 | (2006.01) |

(52) U.S. Cl. ......... 370/402; 235/380; 709/249; 711/114
(58) Field of Classification Search .................. 370/402; 235/380; 709/249; 711/114; 707/2
See application file for complete search history.

(56) References Cited

U.S. PATENT DOCUMENTS

| | | | |
|---|---|---|---|
| 6,654,853 B1 * | 11/2003 | Gates et al. ................... | 711/114 |
| 2002/0011516 A1 * | 1/2002 | Lee ............................... | 235/380 |
| 2003/0167345 A1 * | 9/2003 | Knight et al. ................. | 709/249 |
| 2006/0129700 A1 * | 6/2006 | Bopardikar ..................... | 710/2 |
| 2006/0155674 A1 * | 7/2006 | Traut et al. ...................... | 707/2 |
| 2009/0037938 A1 * | 2/2009 | Frank .............................. | 719/320 |

FOREIGN PATENT DOCUMENTS
WO    WO 2004063836 A2 *    7/2004

OTHER PUBLICATIONS

Office Action issued May 25, 2011 in corresponding Chinese Application 200910169549.2 (English Summary of Office Action attached).

* cited by examiner

Primary Examiner — Ronald Abelson
(74) Attorney, Agent, or Firm — Alston & Bird LLP (57) ABSTRACT

The present invention may be related to a bridge for communications in a data communication system. The bridge may include a first interface, a second interface, a memory and a micro control unit. The first interface may be adapted to couple with a first computing device in the data communication system. The second interface may be adapted to couple with a second computing device in the data communication system. The memory may be adapted to store a set of codes sent from the first computing device via the first interface, wherein the set of codes is related to one of at least one function device of the first computing device. Moreover, the micro control unit may be configured to execute the set of codes for generating device information in a format consistent with a protocol type of the second interface. The device information may include parameters related to the one function device.

12 Claims, 9 Drawing Sheets

BRIDGES AND COMPUTING DEVICES WITH BRIDGES

CROSS-REFERENCE TO RELATED APPLICATIONS

This application claims the benefit of U.S. Provisional Application No. 61/176,439, filed May 7, 2009.

BACKGROUND OF THE INVENTION

The present invention relates to bridges. More particularly, the present invention relates to computing devices with bridges.

Computing devices, for example, personal computers, laptops and smart phones, are widely used in everyday life. To access data stored in a computing device (a master device, hereinafter "the master"), a peripheral device (a slave device, hereinafter "the slave"), for example, a media player, a universal serial bus (USB) drive or a portable hard disk, may be connected in a wired or wireless fashion to the master through a communication port built in or local to the master. Examples of the communication port may include a USB port (either A-type or B-type), an "Institute of Electrical and Electronics Engineers" (IEEE) 1394 port, a "Peripheral Component Interconnect" (PCI) Express port or a "Serial Advanced Technology Attachment" (Serial ATA; SATA) port. Data communications between the master and the slave may be established with the help of protocols related to the communication ports. For example, a slave such as a USB device may communicate with a master such as a computer by converting data to be transferred into "non return to zero, inverted" (NRZI) signals and then transfer the signals through the "D−" and "D+" ports at the USB device.

The above-mentioned method for data communications between a master and a slave may no longer be useful for data communications between two masters. For example, both of the masters may compete with one another for the role of a master device during data communications when the two masters are coupled together. Consequently, data communications may not be established, which in turn may incur system failure, abnormal end of task (ABEND) or malfunction of the computing devices.

Moreover, with the increasing interest in compact, low-profile and light-weight electronic products, some computing devices may be designed with an economic number of embedded function devices or modules. For example, some computing devices may not include embedded storage media such as a CD-ROM (i.e., a CD-R or CD-RW) or a DVD-ROM (i.e., a DVD-R or DVD-R/W). Furthermore, some may only include a small storage volume (e.g., a small hard disk) which may not be large enough for certain applications. When using such computing devices, users may not have enough functions (e.g., storage media or volume) to use. It may therefore be desirable to have an external device such as a bridge to allow a computing device to use the functions or resources of another computing device without incurring the competition issue.

BRIEF SUMMARY OF THE INVENTION

Examples of the present invention may provide a bridge for communications in a data communication system. The bridge may include a first interface, a second interface, a memory and a micro control unit. The first interface may be adapted to couple with a first computing device in the data communication system. The second interface may be adapted to couple with a second computing device in the data communication system. The memory may be adapted to store a set of codes sent from the first computing device via the first interface, wherein the set of codes is related to one of at least one function device of the first computing device. Moreover, the micro control unit may be configured to execute the set of codes for generating device information in a format consistent with a protocol type of the second interface. The device information may include parameters related to the one function device.

Examples of the present invention may also provide a bridge for communications in a data communication system. The bridge may include a first interface, a second interface and a micro control unit. The first interface may be capable of receiving a set of codes related to one of at least one function device. The second interface may be capable of communications in a protocol type in the data communication system. Moreover, the micro control unit may be configured to execute the set of codes for generating device information in a format consistent with the protocol type of the second interface. The device information may include parameters related to the one function device.

Some examples of the present invention may provide a computing device for communications in a data communication system. The computing device may include at least one function device, an application module and a bridge. The application module may be configured to generate a set of codes related to one of the at least one function device. Moreover, the bridge may further include a first interface to couple with the application module, a second interface to couple with another computing device in the data communication system and a micro control unit configured to execute the set of codes for generating device information in a format consistent with a protocol type of the second interface. The device information may include parameters related to the one function device.

Some examples of the present invention may also provide a method for communications in a data communication system. The data communication system may include a first computing device, a second computing device and a bridge coupled between the first and the second computing devices via a first interface and a second interface of the bridge, respectively. The method may include providing at least one item related to at least one function device of the first computing device, identifying if one of the at least one item is selected, wherein the one item is related to one of the at least one function device of the first computing device, generating a set of codes related to the one function device and to a protocol type supported by the second interface of the bridge if the one item is selected, generating device information for the one function device by executing the set of codes, and starting a negotiation process between the first and the second computing devices based on the device information.

Other examples of the present invention may further provide a method for communications in a data communication system. The data communication system may include a first computing device and a second computing device. The method may include providing at least one item related to at least one function device, identifying if one of the at least one item is selected, wherein the one item is related to one of the at least one function device, generating a set of codes related to the one function device and to a protocol type supported by an interface between the first and second computing devices, generating device information for the one function device by executing the set of codes; and starting a negotiation process in the data communication system based on the device information.

Other examples of the present invention may also provide a data communication system. The data communication system may include a first computing device and a bridge. The first computing device may include an application module capable of generating a set of codes related to one of at least one function device of the first computing device. Moreover, the bridge may further include a first interface, a second interface and a micro control unit. The first interface may be adapted to couple with the application module. The second interface may be adapted to couple with another computing device in the data communication system. The micro control unit may be configured to execute the set of codes for generating device information in a format consistent with a protocol type of the second interface. The device information may include parameters related to the one function device.

Additional features and advantages of the present invention will be set forth in part in the description which follows, and in part will be obvious from the description, or may be learned by practice of the invention. The features and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings examples which are presently preferred. It should be understood, however, that the invention is not limited to the precise arrangements and instrumentalities shown.

In the drawings.

DETAILED DESCRIPTION OF THE INVENTION

Reference will now be made in detail to the present examples of the invention, examples of which are illustrated in the accompanying drawings. Wherever possible, the same reference numbers will be used throughout the drawings to refer to the same or like parts.

Figure 1A:
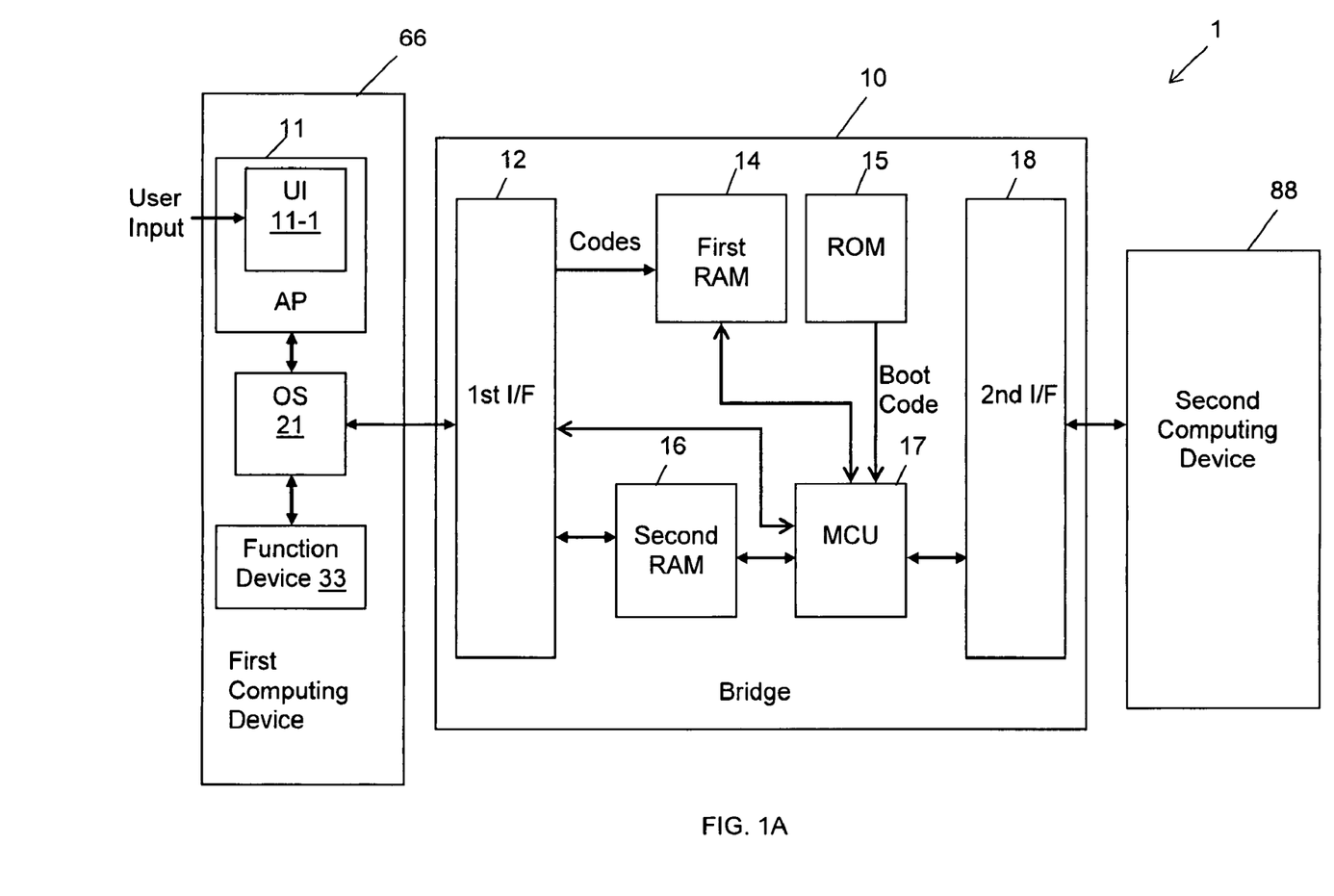
FIG. 1A is a schematic block diagram illustrating a data communication system according to an example of the present invention.

FIG. 1A is a schematic block diagram illustrating a data communication system 1 according to an example of the present invention. Referring to FIG. 1A, the data communication system 1 may include a first computing device 66, a second computing device 88, and a bridge 10 between the first computing device 66 and the second computing device 88. The first computing device 66 may include but is not limited to one of a server, a main frame, a personal computer, a laptop computer, a notebook computer and a smart phone, and may be provided with an application (AP) module 11 and an operating system (OS) 21. The AP module 11 may be implemented in software, which may include programming codes that may be installed in the first computing device 66. Alternatively, the AP module 11 may be implemented in hardware, which may be fabricated in integration chip (IC). Skilled persons in the art will understand that the hardware implementation may be more advantageous in view of operation speed while the software implementation may be more cost effective in view of design complexity.

Furthermore, the first computing device 66 may include at least one function device 33, which may be controlled by the OS 21. The at least one function device 33 may further include at least one of a physical device or a pseudo device. In one example, the at least one function device 33 may include a physical human interface device (HID) such as a mouse or a keyboard. In another example, the at least one function device 33 may include a physical embedded device such as one of a CD-ROM (i.e. a CD-R or CD-RW), a DVD-ROM (i.e. a DVD-R or DVD-R/W), a hard disk, a network interfacing module or card, a TV tuner and a DVB-T tuner. In still another example, the at least one function device 33 may be related to a virtual machine or a pseudo device, which may take the form of software capable of executing an image file such as a CD image file or a DVD image file, including data structure in a CD or DVD format.

The second computing device 88 may include another computing device such as one of a server, a main frame, a personal computer, a laptop computer, a notebook computer and a smart phone.

The bridge 10 may include a first interface 12 to couple with the first computing device 66, a second interface 18 to couple with the second computing device 88, a first memory 14 such as a random access memory (RAM), a read-only memory (ROM) 15, a second RAM 16 and a micro-control unit (MCU) 17. The ROM 15 may store a boot code. The MCU 17 may load the boot code into a cache or flash memory thereof and execute the boot code to initialize the bridge 10. Moreover, the second RAM 16 may serve as a buffer for data transfer between the first and second computing devices 66 and 88 after the bridge 10 is initialized.

The AP module 11 may further include a user interface (UI) 11-1, which may provide at least one item, either a textual label or a graphical icon, selectable by a user. Each of the at least one item may be related to one of the at least one function device 33. The UI 11-1 may be configured to receive a user input from the user selecting one of the at least one item and in turn one of the at least one function device 33 related to the selected item. The AP module 11 may be configured to generate a set of codes in response to the one item selected by the user and load the codes into the first RAM 14 of the bridge 10 via the first interface 12. The set of codes may include programming codes or firmware executable by the MCU 17. Each of the first and second interfaces 12 and 18 may be configured to support data transfer in one of, for example, a universal serial bus (USB) (either A-type or B-type), an IEEE1394, a Peripheral Component Interconnect (PCI), a Peripheral Component Interconnect Express (PCI Express, PCIe or PCI-Ex) and a serial advanced technology attachment (Serial ATA or SATA) protocols. The protocol type of the second interface 18 is supported by the second computing device 88. The set of codes may be related to the item and in turn the function device 33 selected by the user, and the protocol type of the second interface 18.

In operation, the set of codes may be retrieved from the first RAM 14 and executed by the MCU 17 for generating device information, which may facilitate the second computing device 88 to identify the selected function device 33. Based on the set of codes, the device information may be generated in a format consistent with the protocol type of the second interface 18 and include parameters related to the selected function device 33. The device information may include but is not limited to, for example, at least one of the type, resource, operating frequency, size and/or status of storage, packet format or power consumption of the selected function device 33.

When the device information is sent to the second computing device 88, the AP module 11 may initiate a negotiation process for setting up communications between the first computing device 66 and the second communication device 88 through the bridge 10. Since the device information received by the second computing device 88 is related to the selected function device 33, the second computing device 88 may treat or recognize the first computing device 66 and the bridge 10 as a whole as the selected function device 33. The second computing device 88 may then transmit or receive packets based on the protocol in a type, packet format or size described in the device information. Hence, the second computing device 88 is capable of using the resource or function of the selected function device 33. That is, the selected function device 33 may serve as a slave device, while the second computing device 88 may act like a host relative to the selected function device 33.

As previously discussed, the second interface 18 may be configured to support data transfer in one of the USB, IEEE1394, PCI, PCI Express port and SATA protocols. In the case that the second computing device 88 supports the USB protocol and the second interface 18 includes a USB port, the device information may include a USB device descriptor and the second computing device 88 may receive the USB descriptor during USB initialization for setting up communications between the function device 33 and the second computing device 88 via the second interface 18.

Figure 1B:
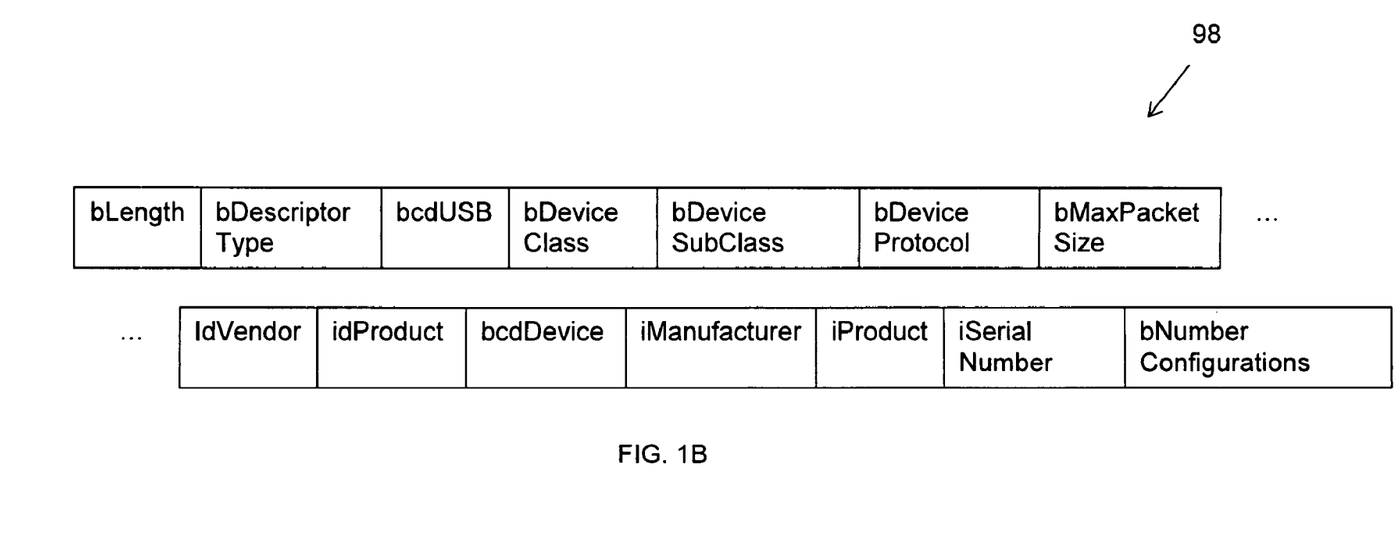
FIG. 1B is a diagram illustrating an exemplary device descriptor for the data communication system illustrated in FIG. 1A.

FIG. 1B is a diagram illustrating an exemplary USB device descriptor 98 for the data communication system 1 illustrated in FIG. 1A. Referring to FIG. 1B, the USB device descriptor 98 may specify basic yet important device information about the selected function device 33. The USB device descriptor 98 may contain information on, for example, the supported protocol, maximum packet size, vendor and product IDs and the number of possible configurations available for the selected function device 33. In one example, the format of the USB device descriptor 98 may be one as shown in the following table:

| Offset | Field | Size | Value | Description |
|---|---|---|---|---|
| 0 | bLength | 1 | Number | Size of the Descriptor in Bytes (18 bytes) |
| 1 | bDescriptorType | 1 | Constant | Device Descriptor (0x01) |
| 2 | bcdUSB | 2 | BCD | USB Specification Number which device complies too. |
| 4 | bDeviceClass | 1 | Class | Class Code (Assigned by USB Org) If equal to Zero, each interface specifies it own class code If equal to 0xFF, the class code is vendor specified. Otherwise field is valid Class Code. |
| 5 | bDeviceSubClass | 1 | SubClass | Subclass Code (Assigned by USB Org) |
| 6 | bDeviceProtocol | 1 | Protocol | Protocol Code (Assigned by USB Org) |
| 7 | bMaxPacketSize | 1 | Number | Maximum Packet Size for Zero Endpoint. Valid Sizes are 8, 16, 32, 64 |
| 8 | idVendor | 2 | ID | Vendor ID (Assigned by USB Org) |
| 10 | idProduct | 2 | ID | Product ID (Assigned by Manufacturer) |
| 12 | bcdDevice | 2 | BCD | Device Release Number |
| 14 | iManufacturer | 1 | Index | Index of Manufacturer String Descriptor |
| 15 | iProduct | 1 | Index | Index of Product String Descriptor |
| 16 | iSerialNumber | 1 | Index | Index of Serial Number String Descriptor |
| 17 | bNumConfigurations | 1 | Integer | Number of Possible Configurations |

Referring to the table, also referring to FIG. 1B, the USB device descriptor 98 may include entries in the "Field" column of different bit sizes and parameters in the "value" column. The "bcdUSB" reports the highest version of USB the function device supports. The value is in binary coded decimal with a format of "0xJJMN" where "JJ" is the major version number, "M" is the minor version number and "N" is the sub minor version number (e.g., USB 2.0 is reported as 0x0200, USB 1.1 as 0x0110 and USB 1.0 as 0x0100). The "bDeviceClass", "bDeviceSubClass" and "bDeviceProtocol" are used by the operating system of the second computing device 88 to find a class driver for the selected function device 33. Typically only the "bDeviceClass" is set at the device level. Most class specifications choose to identify itself at the interface level and as a result set the "bDeviceClass" as 0x00, which allows for the one device to support multiple classes. The "bMaxPacketSize" field reports the maximum packet size for endpoint zero. All USB devices must support endpoint zero. The "idVendor" and "idProduct" are used by the operating system to find a driver for the selected function device 33. The "Vendor ID" is assigned by the USB-IF. The "bcdDevice" has the same format than the bcdUSB and is used to provide a device version number. Three string descriptors may exist to provide details of the manufacturer, product and serial number. There is no requirement to have string descriptors. If no string descriptor is present, an index of zero should be used. The "bNumConfigurations" defines the number of configurations the device supports at its current speed.

In the present example, the AP module 11 generates the set of codes, which may then be executed by the MCU 17. The MCU 17, based on the set of codes, generates a device descriptor in a format as shown in FIG. 1B and configures the parameters in the "Value" column of the above-mentioned table. When the device information, i.e., the device descriptor, from the bridge 10 is received via the second interface 18, the second computing device 88 may recognize the function device 33 as a USB device attached to a USB port of the second computing device 88. For example, a hard disk of the first computing device 66 may be selected. After receiving the device information, the second computing device 88 may treat the first computing device 66 as an attached hard disk and use the resource provided by the hard disk in the same way as its own hard disk.

Those skilled in the art will understand that, even though only the USB descriptor format and parameters are described, the device information may be generated in another descriptor format with other parameters suitable for one of the IEEE1394, PCI, PCI Express and SATA protocols.

Figure 1C:
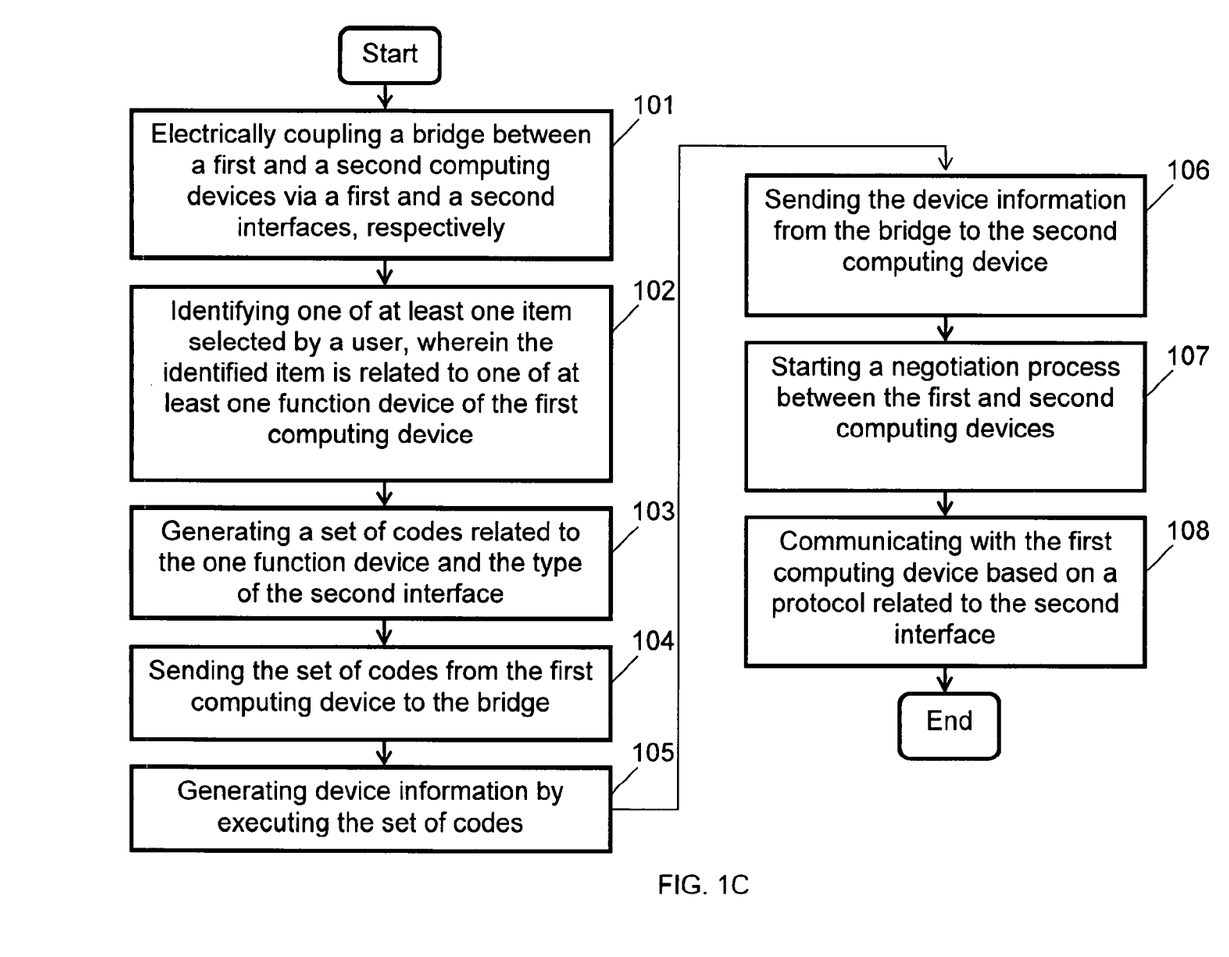
FIG. 1C is a flow diagram illustrating a method for data communications in the data communication system illustrated in FIG. 1A.

FIG. 1C is a flow diagram illustrating a method of communications between the first and second computing devices 66 and 88 in the data communication system 1 illustrated in FIG. 1A. Referring to FIG. 1C, at step 101, the bridge 10 may be electrically coupled between the first and second computing devices 66 and 88 via the first and second interfaces 12 and 18, respectively. With respect to the coupling, it is not necessary that the first interface 12 and the second interface 18 are physically connected to the first computing device 66 and the second computing device 88 in a wired manner. For example, the first interface 12 or the second interface 18 may include a wireless USB port capable of being hot-plugged from the first computing device 66 or the second computing device 88. Therefore, the connection type or condition of the first interface 12 or the second interface 18 should not be construed to limit the scope of the present invention in any manner.

At step 102, one of the at least one item provided by the UI 11-1 may be identified by the AP module 11 when the one item is selected by a user of the system 1. The identified one item is related to one of the at least one function device 33 of the first computing device 66.

At step 103, a set of codes related to the one function device 33 may be generated by the AP module 11. The set of codes may include information on the one function device 33 and the protocol type of the second interface 18.

Next, at step 104, the set of codes may be sent from the first computing device 66 via the first interface 12 to the bridge 10. Specifically, the set of codes are stored in the first RAM 14 of the bridge 10.

At step 105, device information may be generated by executing the set of codes in the MCU 17. Specifically, the MCU 17 may, based on the set of codes, generate the device information in a format consistent with the protocol type of the second interface 18, while configuring parameters for the one function device 33.

The device information may then be sent from the bridge 10 to the second computing device 88 via the second interface 18 at step 106. Since the device information is related to the one function device 33, the second computing device 88 may recognize the first computing device 66 as the one function device 33.

At step 107, a negotiation process between the first and second computing devices 66 and 88 may be initiated by the AP module 11 so as to set up communications therebetween.

Next, at step 108, the second communicating device 88 may communicate with the first computing device 66 by using a protocol related to the second interface 18. In one example, the protocol may be one of the USB, IEEE1394, PCI, PCI Express and SATA protocols.

Figure 2A:
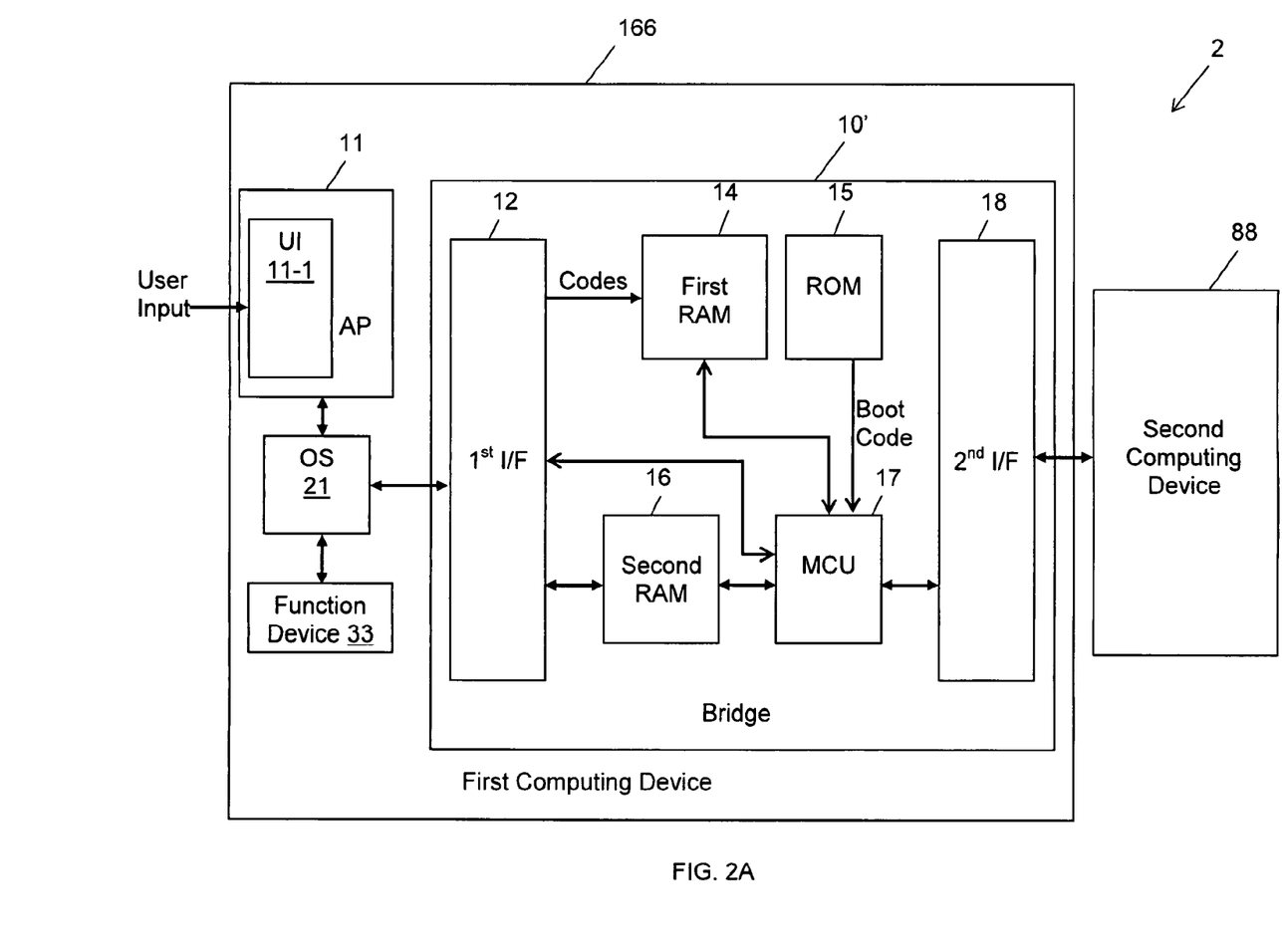
FIG. 2A is a schematic block diagram illustrating a data communication system according to another example of the present invention.

FIG. 2A is a schematic block diagram illustrating a data communication system 2 according to another example of the present invention. Referring to FIG. 2A, the data communication system 2 may be similar to the data communication system 1 described and illustrated with reference to FIG. 1A except that, for example, a bridge 10' may be embedded in a first computing device 166.

Figure 2B:
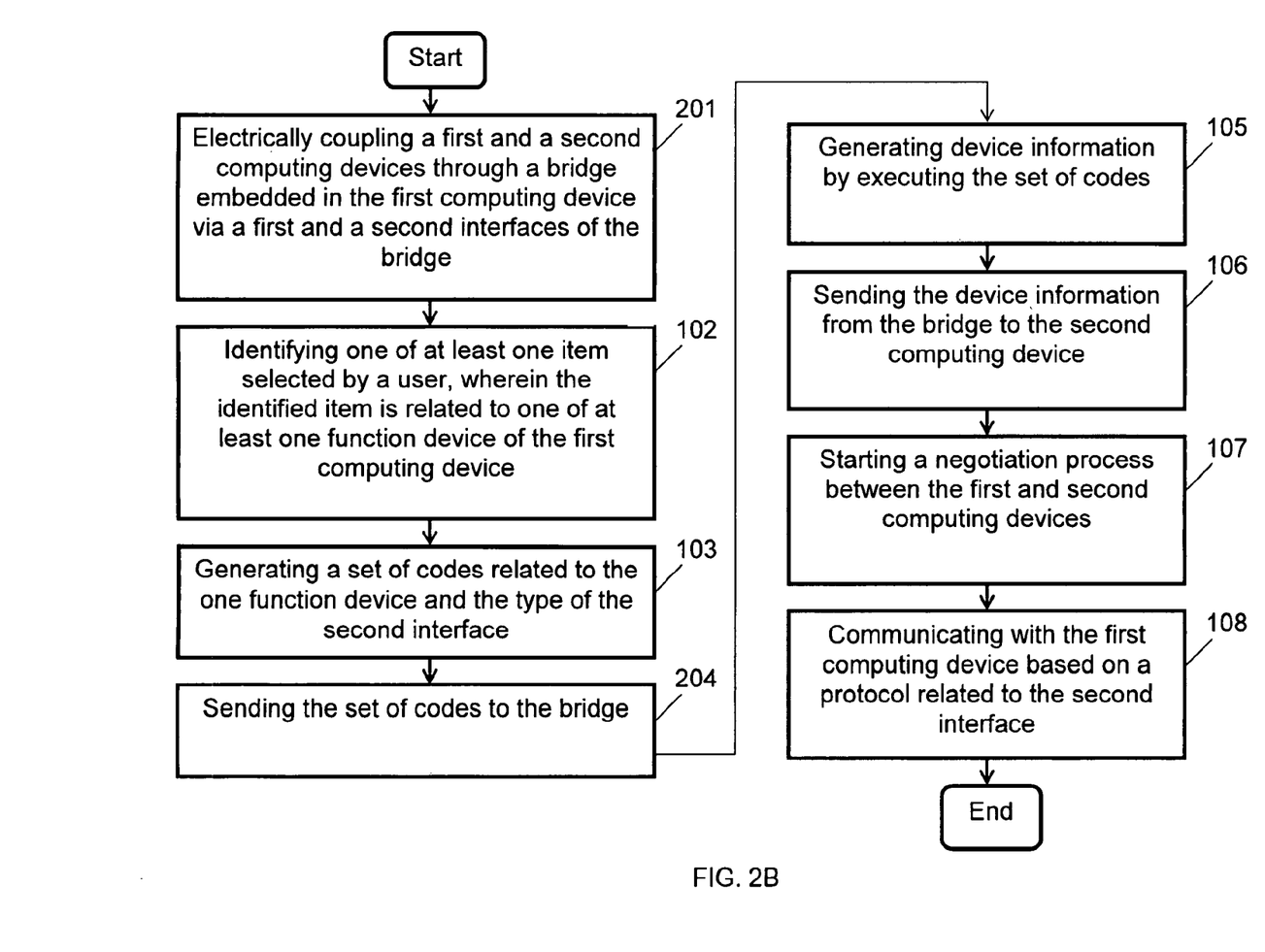
FIG. 2B is a flow diagram illustrating a method for data communications in the data communication system illustrated in FIG. 2A.

FIG. 2B is a flow diagram illustrating a method of communications between the first and second computing devices 166 and 88 of the data communication system 2 illustrated in FIG. 2A. Referring to FIG. 2B, the method may be similar to that described and illustrated with reference to FIG. 1B except that, for example, at step 201 the first and second computing devices 166 and 88 are electrically coupled to each other through the bridge 10' embedded in the first computing device 166 via the first and second interfaces 12 and 18 of the bridge 10'.

Furthermore, a set of codes generated by the AP module 11 at step 103 may be sent to the bridge 10' at step 204.

Figure 3A:
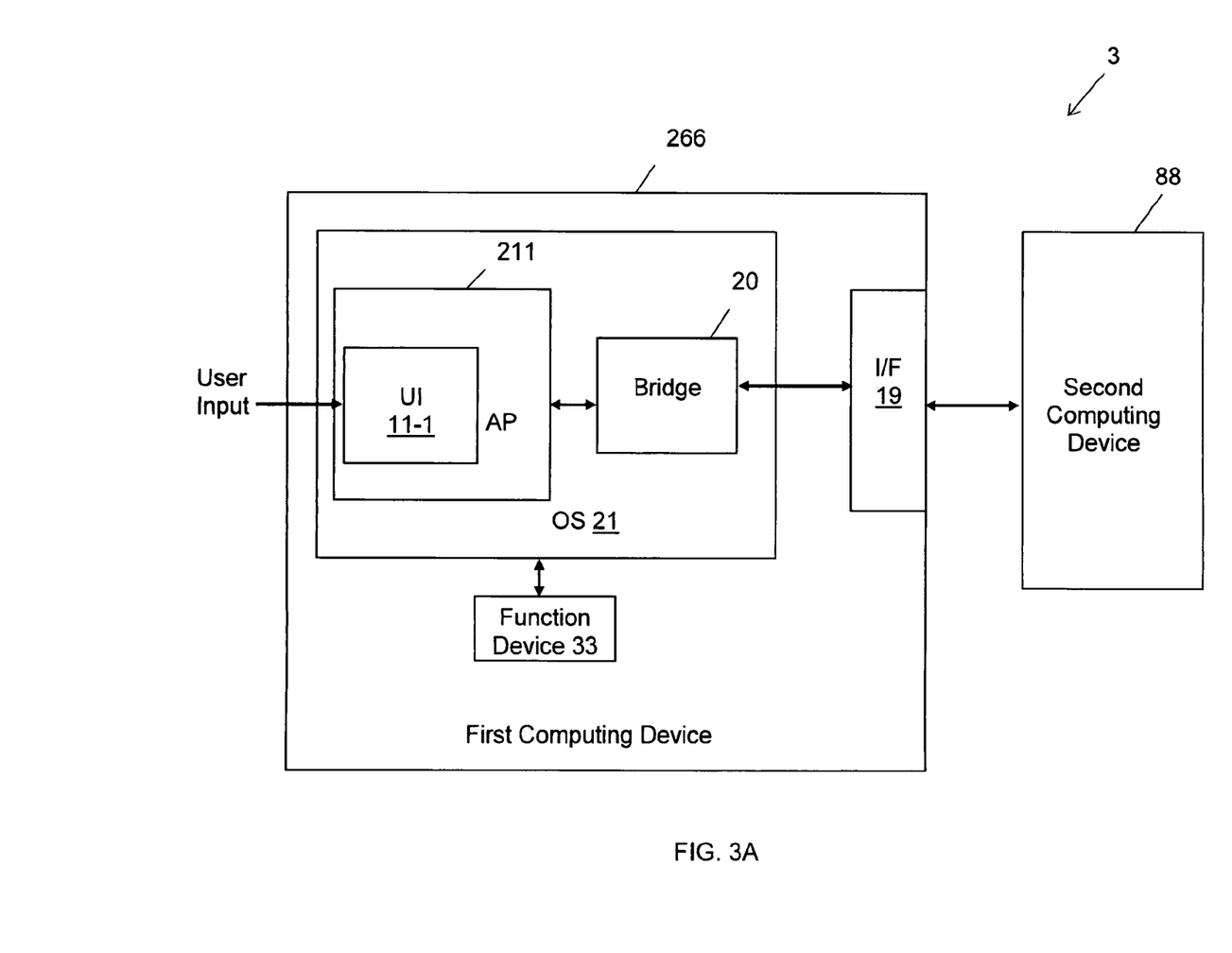
FIG. 3A is a schematic block diagram illustrating a data communication system according to yet another example of the present invention.

FIG. 3A is a schematic block diagram illustrating a data communication system 3 according to yet another example of the present invention. Referring to FIG. 3A, the data communication system 3 may include a first computing device 266 as well as the second computing device 88. The first computing device 266 may include an operating system (OS) 21, an AP module 211 and a bridge 20. The AP module 211, which may be similar to the AP module 11 described and illustrated with reference to FIGS. 1A and 2A, may generate a set of codes in response to a signal from the UI 11-1 based on a function device 33 selected by a user. The set of codes may be executed by the OS 21 of the first computing device 266 for generating device information. The set of codes may be related to the selected function device 33 and the protocol type of an interface 19. The interface 19, similar to the second interface 18 illustrated in FIGS. 1A and 2A, may support at least one of the USB, IEEE1394, PCI, PCI Express or SATA protocol.

In one example, the interface 19 may include a USB port, which may be coupled with another USB interface (not shown) of the second computing device 88. Those skilled in the art can easily understand that the two USB interfaces may be coupled with each other in a wired manner through a signal crossover cable such as a USB cable or in a wireless manner through at least one antenna. In the present example, based on the set of codes from the AP module 211, the OS 21 may generate a device descriptor, for example, a USB device descriptor related to the function device 33 of the first computing device 266. Moreover, the OS 21 may configure parameters in the "value" column of the device descriptor based on the set of codes. For example, a type field of the device descriptor describing the type of the function device 33 may be configured, indicating that the function device 33 is a USB device attachable to the second computing device 88.

The bridge 20 may be configured to handle the communications between the OS 21 and the second computing device 88 through the interface 19. For example, the bridge 20 may send the device descriptor to the second computing device 88 via the interface 19. In one example, the bridge 20 may include software or a driver for the OS 21 to communicate with the second computing device 88 via the interface 19. In another example, the bridge 20 may be a USB driver installed in the first computing device 266 and run as part of a kernel of the OS 21 for handing communications via the interface 19.

Figure 3B:
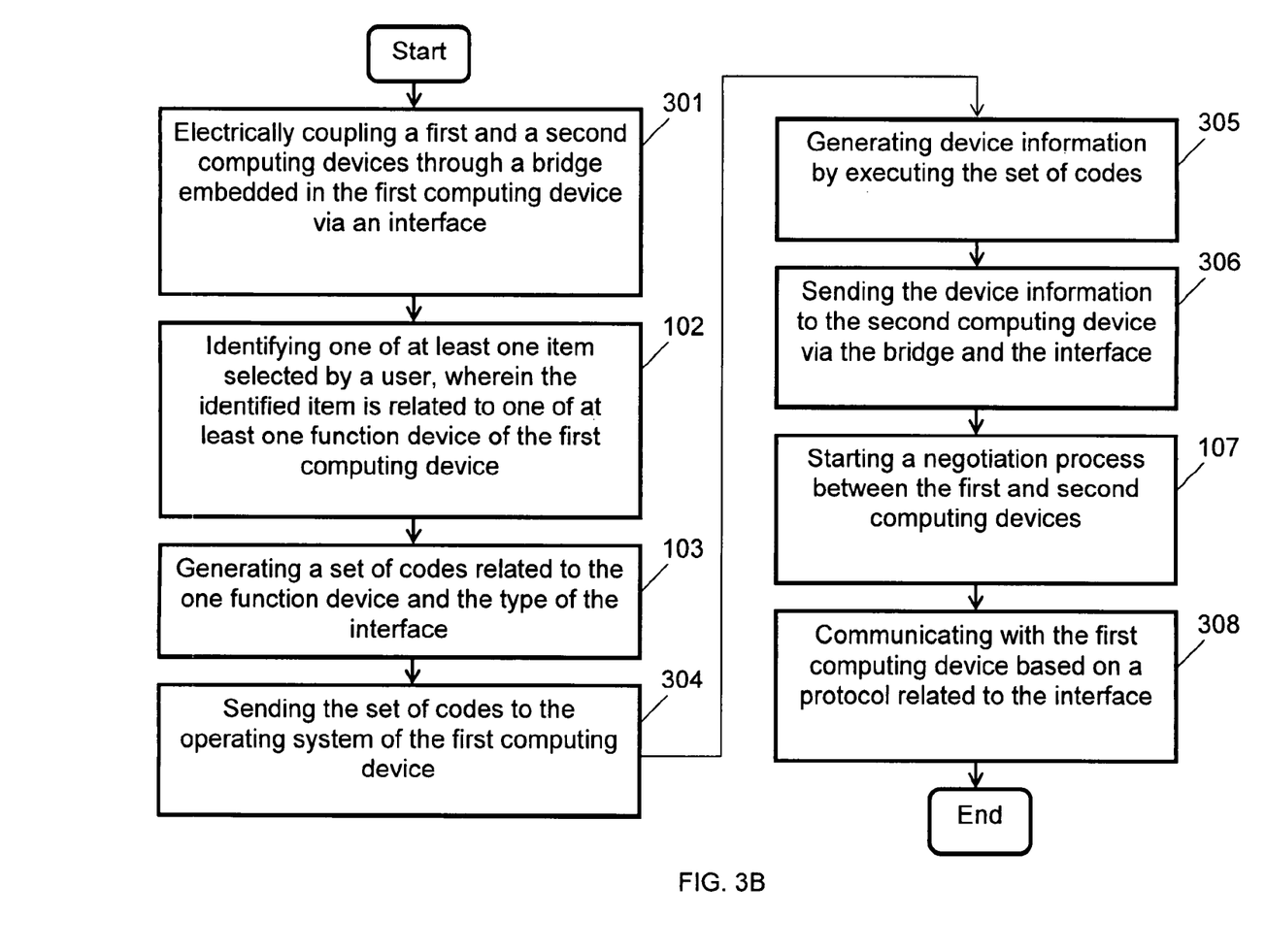
FIG. 3B is a flow diagram illustrating a method for data communications in the data communication system illustrated in FIG. 3A.

FIG. 3B is a flow diagram illustrating a method of communications between the first computing device 266 and the second computing device 88 of the data communication system 3 illustrated in FIG. 3A. Referring to FIG. 3B, at step 301, the first computing device 266 and the second computing device 88 may be electrically coupled to one another through the bridge 20 embedded in the first computing device 266 via the interface 19.

After a set of codes is generated by the AP module 211 at step 103, the set of codes may be sent to the OS 21 of the first computing device 266 at step 304.

The set of codes may then be executed by the OS 21 so as to generate the device information in the form of, for example, a device descriptor, at step 305. In the case that the interface 19 includes a USB port, referring again to FIG. 1B, based on the set of codes, the OS 21 may generate a device descriptor in a format consistent with the protocol type of the interface 19 and configure parameters for the selected function device 33.

At step 306, the OS 21 of the first computing device 266 may send the device information to the second computing device 88 via the bridge 20 and the interface 19. Based on the device descriptor that describes the type, protocol and/or functionality of the function device 33, the first computing device 266 may be treated as the function device 33.

Subsequently, after a negotiation process at step 107, the second computing device 88 may communicate with the first communication device 266 that emulates the function device 33, using a protocol supported by the interface 19.

Figure 4A:
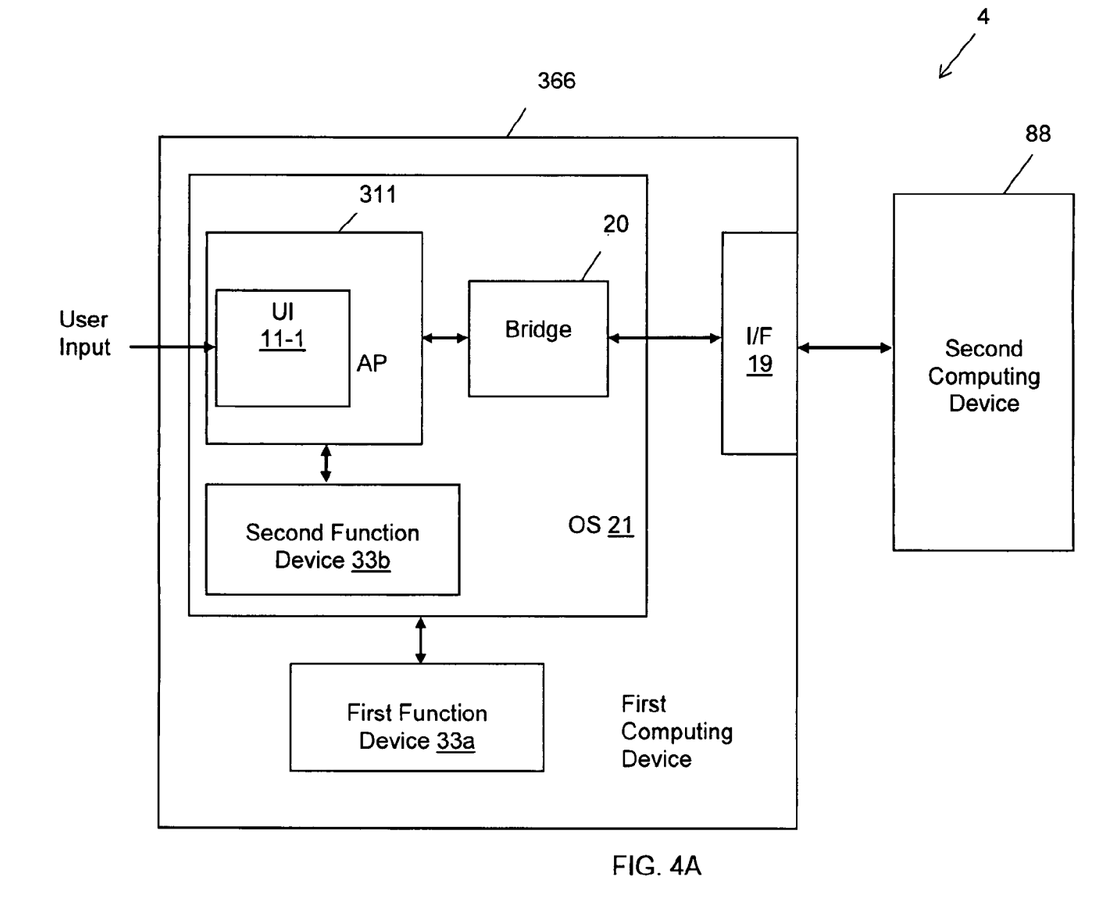
FIG. 4A is a schematic block diagram illustrating a data communication system according to still another example of the present invention.

FIG. 4A is a schematic block diagram illustrating a data communication system 4 according to still another example of the present invention. Referring to FIG. 4A, the data communication system 4 may include a first computing device 366 as well as the second computing device 88. The first computing device 366 may include an AP module 311 in addition to the operating system (OS) 21 and the bridge 20. The AP module 311 may be configured to support at least one first function device 33a and at least one second function device 33b. The at least one first function device 33a may each include a physical function device while the at least one second function device 33b may each be related to a virtual machine or a pseudo device. The at least one second function device 33b may include software capable of simulating a function related to a physical device, for example, a CD-ROM or a DVD-ROM. When executed by the OS 21, the at least one second function device 33b may serve as a virtual machine or pseudo device capable of accessing or executing data in an image file. In one example, the image file may include a CD image or a DVD image comprising data compressed within data structure in a CD or DVD format, respectively, which can be read or accessed by the OS 21.

Figure 4B:
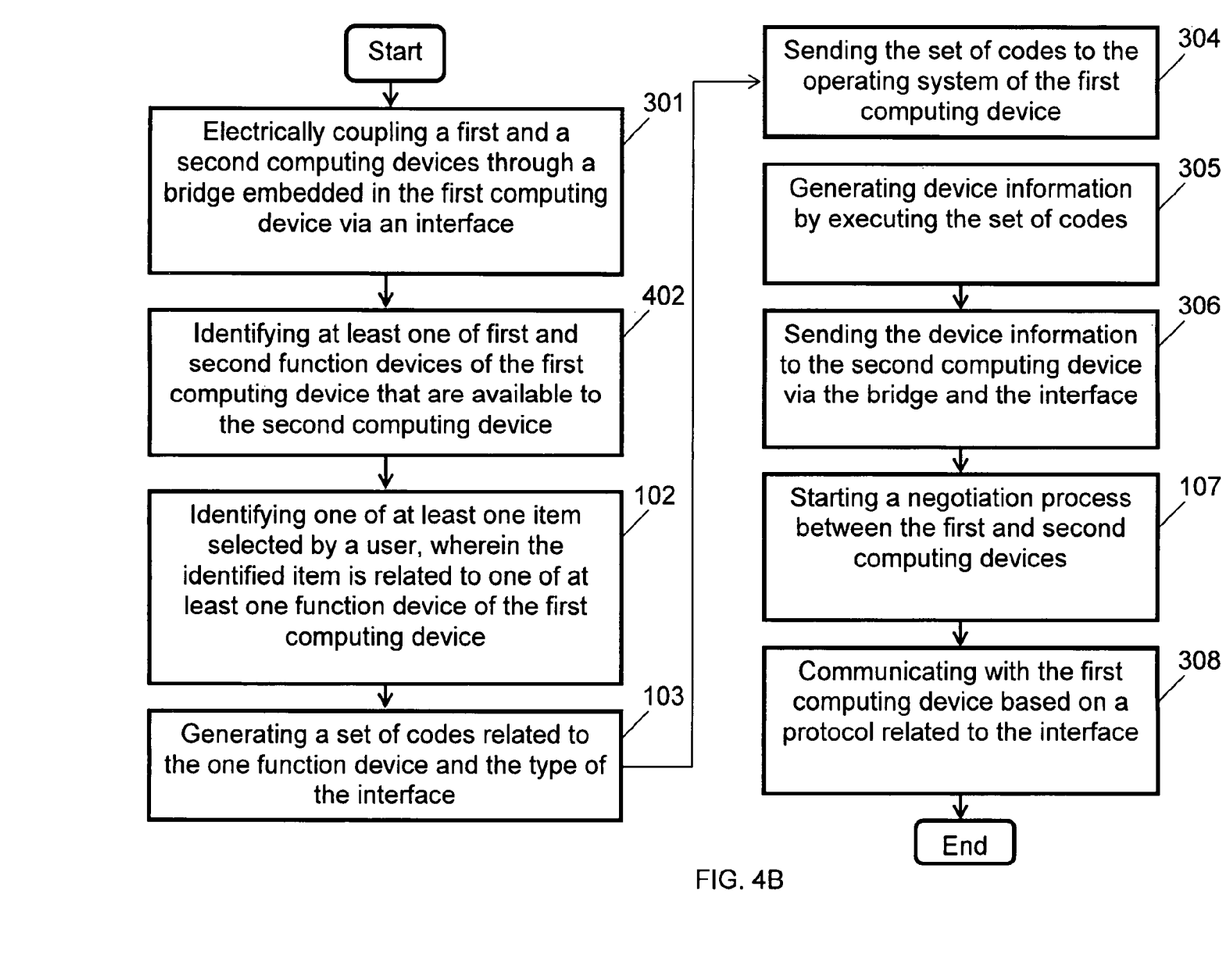
FIG. 4B is a flow diagram illustrating a method for data communications in the data communication system illustrated in FIG. 4A.

FIG. 4B is a flow diagram illustrating a method of communications between the first and second computing devices 366 and 88 of the data communication system 4 illustrated in FIG. 4A. Referring to FIG. 4B, the method may be similar to that described with reference to FIG. 4A except that, for example, at step 402, the AP module 311 may identify the at least one first and second function devices 33a and 33b that are available to the OS 21, and generate items related to these function devices 33a and 33b. The items may be displayed by the UI 11-1 for a user to select. Moreover, the AP module 311 may generate a set of codes in response to a signal from the UI 11-1 based on one of the at least one function devices 33a and 33b selected by the user. The set of codes may be executed by the OS 21 of the first computing device 366 for generating device information, depending on the selected function device. For example, if one of the at least one second function device 33b related to a virtual CD-ROM is selected, then a device information or a device descriptor related to the CD-ROM may be generated and sent to the second computing device 88.

It will be appreciated by those skilled in the art that changes could be made to the examples described above without departing from the broad inventive concept thereof. It is understood, therefore, that this invention is not limited to the particular examples disclosed, but it is intended to cover modifications within the spirit and scope of the present invention as defined by the appended claims.

Further, in describing representative examples of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A computing device for communications in a data communication system, the computing device comprising:
   at least one function device;
   an application module further comprising:
      a user interface configured to provide at least one item to be selected by a user, each of the at least one item being related to one of the at least one function device,
   wherein the application module is configured to generate a set of codes related to one of the at least one function device of the computing device; and
   a bridge further comprising:
      a first interface to couple with the application module;
      a second interface to couple with another computing device in the data communication system; and
      a micro control unit configured to execute the set of codes for generating device information in a format consistent with a protocol type of the second interface, the device information including parameters related to the one function device of the computing device.

2. The computing device of claim 1, wherein the at least one function device includes at least one of a physical device or a pseudo device.

3. The computing device of claim 2, wherein the physical device includes one of a human interface device attached to the first computing device and an embedded device embedded in the first computing device.

4. The computing device of claim 2, wherein the pseudo device includes a virtual machine capable of executing an image file.

5. The computing device of claim 1, wherein the protocol type includes one of a universal serial bus (USB), an IEEE1394, a Peripheral Component Interconnect (PCI), a Peripheral Component Interconnect Express (PCI Express) and a serial advanced technology attachment (SATA) protocols.

6. The computing device of claim 5, wherein the device information in format includes one of a USB, an IEEE 1394, a PCI, a PCI Express and a SATA device descriptors.

7. A computing device for communications in a data communication system, the computing device comprising:
   at least one function device;
   an application module further comprising:
      a user interface configured to provide at least one item to be selected by a user, each of the at least one item being related to one of the at least one function device,
      wherein the application module is configured to generate a set of codes related to one of the at least one function device of the computing device, the set of codes is further related to one of the at least one item selected by the user; and
   a bridge further comprising:
      a first interface to couple with the application module;
      a second interface to couple with another computing device in the data communication system; and
      a micro control unit configured to execute the set of codes for generating device information in a format consistent with a protocol type of the second interface, the device information including parameters related to the one function device of the computing device.

8. The computing device of claim 7, wherein the at least one function device includes at least one of a physical device or a pseudo device.

9. The computing device of claim 8, wherein the physical device includes one of a human interface device attached to the first computing device and an embedded device embedded in the first computing device.

10. The computing device of claim 8, wherein the pseudo device includes a virtual machine capable of executing an image file.

11. The computing device of claim 7, wherein the protocol type includes one of a universal serial bus (USB), an IEEE1394, a Peripheral Component Interconnect (PCI), a Peripheral Component Interconnect Express (PCI Express) and a serial advanced technology attachment (SATA) protocols.

12. The computing device of claim 11, wherein the device information in format includes one of a USB, an IEEE 1394, a PCI, a PCI Express and a SATA device descriptors.

* * * * *